United States Patent [19]

Levin et al.

[11] 4,128,333
[45] Dec. 5, 1978

[54] LIGHT EXPOSURE DEVICE INCLUDING LIGHT DIFFUSING AND ABSORBING REGIONS THEREIN

[75] Inventors: Robert E. Levin, S. Hamilton; George J. English, Reading, both of Mass.

[73] Assignee: GTE Sylvania Incorporated, Danvers, Mass.

[21] Appl. No.: 812,833

[22] Filed: Jul. 5, 1977

[51] Int. Cl.$^2$ ............................................ G03B 27/54
[52] U.S. Cl. ...................................................... 355/67
[58] Field of Search .................................. 355/67, 70

[56] References Cited

U.S. PATENT DOCUMENTS 3,697,177  10/1972  Booth ..................................... 355/67

Primary Examiner—Richard A. Wintercorn
Attorney, Agent, or Firm—Lawrence R. Fraley

[57] ABSTRACT

A light exposure device including a telescoping housing which defines therein adjacently oriented light-diffusing and light-absorbing regions. The device's light source is located within the diffusing region while a light-transmitting platen is positioned immediately adjacent the absorbing region. The device is ideally suited for use within a portable reflex copier which utilizes a suitable photosensitive material.

17 Claims, 6 Drawing Figures

LIGHT EXPOSURE DEVICE INCLUDING LIGHT DIFFUSING AND ABSORBING REGIONS THEREIN

CROSS REFERENCE TO COPENDING APPLICATIONS

An application entitled "Copy Apparatus Using Chemical Flashlamp" (Inventor: T. Fohl) was filed May 13, 1977 and is now listed in the Patent and Trademark Office under Ser. No. 796,795. Ser. No. 796,795 defines a portable, low-cost copier for use with photosensitized papers. The copier uses a chemical flash type lamp as the source of illumination.

An application entitled "Flashlamp Assembly with Tapered Housing" (Inventers: R. Bonazoli and W. Morgan) was filed July 5, 1977 and is listed in the Patent and Trademark Office under Ser. No. 812,916. Ser. No. 812,916 describes a flashlamp assembly which may be used as the light source for the present invention. A design application under Ser. No. 813,109 (R. P. Bonazoli et al) was also filed July 5, 1977. All of the above applications are assigned to the assignee of the present invention.

BACKGROUND OF THE INVENTION

The invention relates to light exposure devices and particularly to light exposure devices suitable for using in copying systems. Even more particularly, the invention relates to light exposure devices for use as part of portable reflex copiers.

Most known copy systems inherently possess several disadvantages including large size, high cost, and the requirement for continual maintenance. Smaller copiers exist but these typically require highly complex reflector and optical systems, rendering such components also very expensive and readily susceptible to misalignment.

It is believed, therefore, that a light exposure device, which is relatively small, easy to operate, can be produced relatively inexpensively, and also provides substantially uniform irradiation would constitute an art advancement. It is further believed that a light exposure device capable of being utilized within a portable reflex copier to thus provide said copier with the above features would also constitute an art advancement. It will be further understood from the following description that the light exposure device of the invention is capable of being used in other applications requiring substantially uniform irradiation (e.g., the processing of contact prints).

OBJECTS AND SUMMARY OF THE INVENTION

It is therefore a primary object of the present invention to provide a light exposure device having the above several features. It is a further object of the invention to provide a portable reflex copier system which includes the above exposure device as part thereof.

According to one aspect of the invention, there is provided a light exposure device which comprises an open-ended housing including therein a light-absorbing region and a light-diffusing region. The device's light source is positioned within the light-diffusing region whereby this region will direct the light from the source toward the absorbing region and the housing's open end. Accordingly, only a portion of the light will uniformly pass through the open end.

In accordance with another aspect of the invention, a portable reflex copier is provided which includes the above exposure device as part thereof. The copier also includes a layer of photosensitive material positioned immediately adjacent the device's platen. This material is adapted for absorbing a portion of the light passing through the platen and reflecting back from selected areas within an original.

DETAILED DESCRIPTION OF THE PREFERRED EMBODIMENTS

For a better understanding of the present invention together with other and further objects, advantages and capabilities thereof, reference is made to the following disclosure and appended claims in connection with the above-described drawings.

Figure 1:
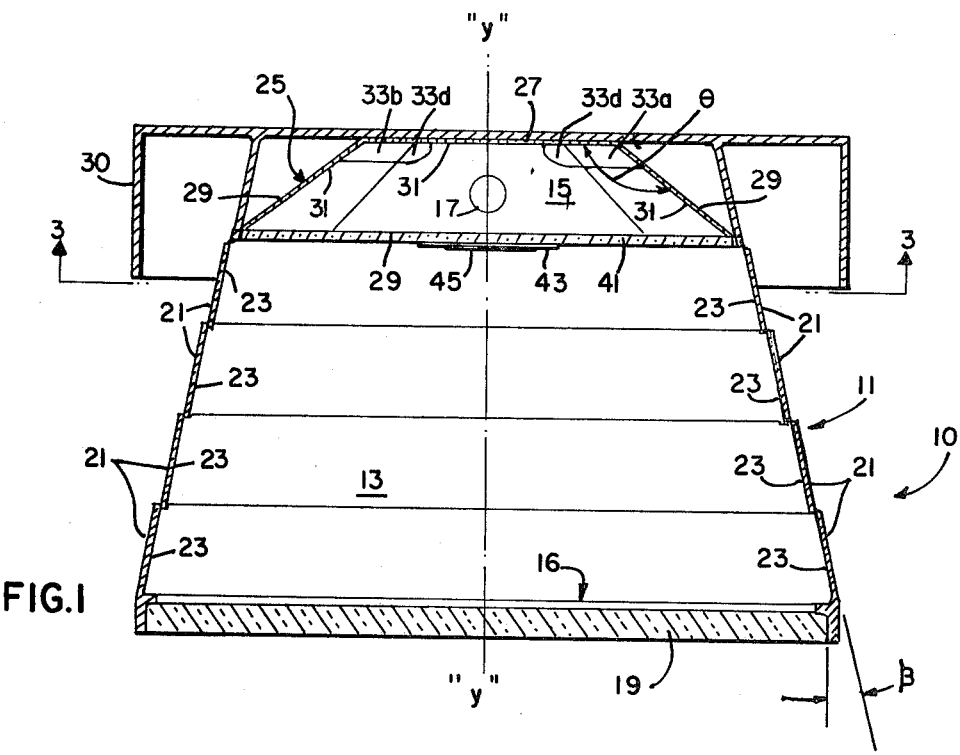
FIG. 1 is a side elevational view, in section, of a light exposure device in accordance with a preferred embodiment of the invention.

In FIG. 1 is shown a light exposure device 10 in accordance with a preferred embodiment of the invention. Device 10 is capable of providing substantially uniform irradiation to a respective original (e.g. document, contact print, etc.). By uniform is meant irradiation having a change in intensity no greater than from about 5 to 7 percent. This relatively small differential makes the present invention particularly suited for use within a reflex copier system.

Photo-activated photochemical processes used in many forms of photosensitive reflex materials are highly responsive to energy (power x time duration) and not power. Consequently, exposure of the reflex material is determined by the irradiance of the material integrated with respect to the time element.

It will be understood from the following description, therefore, that the preferred light source for use with the invention is of the chemical flash type. A chemical flash type lamp emits a relatively highly intense flash over a brief time period. Typically, such lamps comprise a sealed glass envelope containing a combustible material and a combustion-supporting atmosphere. An example of a chemical flash type lamp is shown in U.S. Pat. No. 3,535,063, which is assigned to the assignee of the present invention. Other types of chemical flashlamps can also be used with the invention, including those which are electrically activated such as by a high voltage pulse from a piezoelectric crystal. An example is described in U.S. Pat. No. 4,008,040, which is also assigned to the assignee of the instant invention. As earlier stated, the present invention is also capable of using the flashlamp assembly described in the copending application under Ser. No. 812,916.

The present invention is not limited to the use of chemical flashlamps, however. Other varieties of lamps, including controlled strobe and tungsten-halogen, may be successfully used herein. Chemical flashlamps are preferred because of the inherent low cost and uniform output of such components.

As is well known, reflex copy systems must be sensitive enough to respond to minor differentials in absorbed energy. It can readily be seen, therefore, that a light exposure device capable of providing the irradiation uniformity within the range defined would provide a significant advancement in the art.

Exposure device 10 comprises a housing 11 which defines therein a light-absorbing region 13 and a light-diffusing region 15. Housing 11 also includes an open end 16. Diffusing region 15 includes therein the previously defined light source 17. Source 17 may be positioned in region 15 using any well-known technique and further description is thus not considered necessary. Light source 17 is preferably centrally located within region 15 and, more specifically, on a central axis "y-y" of device 10 equidistant from the outwardly extending side walls which define region 15. If it is desired to use the photoflash lamp described in Ser. No. 812,916, a suitable opening can be provided within housing 11 to permit insertion of the lamp therethrough.

Device 10 may further comprise a light-transmitting platen 19 which can be plastic, glass, or similar material capable of permitting the light generated within device 10 to pass therethrough. Platen 19 is positioned within open end 16 to thus receive this light. Only a portion of the light directed toward absorbing region 13 and platen 19 from diffusing region 15 will pass through the platen. According to one aspect of the invention, this portion constitutes about 25 percent of the total light emitted from source 17. The present invention preferably affords an output within a range of 10 to 30 percent of light 17's stated emission. The remainder of this light is absorbed by region 13 which thus provides a dual function. Firstly, it absorbs almost all of the light from source 17 which would strike platen 19 at angles other than substantially normal. Secondly it functions to absorb the light reflected back through platen 19 (such as from an adjacent document) to thus stabilize the light level within housing 11. This second feature is considered particularly important when photosensitive materials are exposed which require relatively long periods of exposure.

Light-absorbing region 13 is defined by a plurality of sloping walls 21 which each include a substantially planar, darkened (e.g. coated with optical black) interior surface 23. Each surface 23 is established at a predetermined angle $\beta$ with platen 19. Understandably, the function of surface 23 is to absorb a portion of the light from source 17 which would otherwise be reflected (if surfaces 23 were reflective as in prior art exposure devices) and adversely affect the irradiance uniformity through platen 19. Angle $\beta$ is within the range of about 5° to about 30° degrees.

Figure 2:
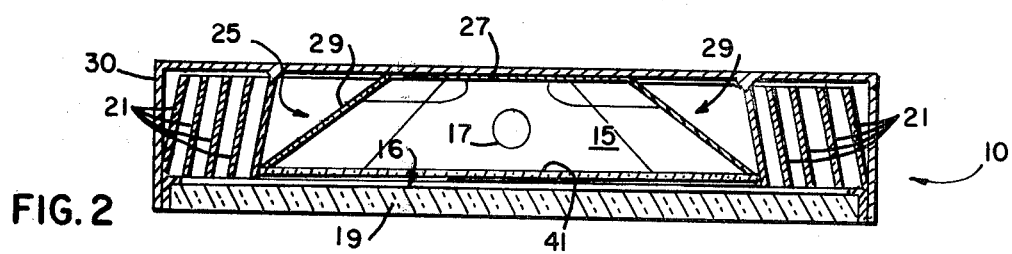
FIG. 2 is a side elevational view showing the device of FIG. 1 compressed.

In comparing FIGS. 1 and 2, it can be seen that sloping walls 21 are established in a telescoping arrangement to permit compressing of housing 11. The compressed housing is shown in FIG. 2 and clearly illustrates the compactness of the invention, said feature considered a necessity in portable reflex copier system design. As one example, the device of FIG. 1 has an overall height of about 7 inches while the compressed version of FIG. 2 is only about 1.5 inches high.

Housing 11 further includes a hooded member 25 which serves to define diffusing region 15. Member 25 comprises an end or top wall 27 and a plurality of side walls 29 angularly positioned (angle $\theta$ in FIG. 1) with respect to wall 27. In one embodiment of the invention, angle $\theta$ varies from about 146 to 156 degrees, depending on the respective side wall 29 location. Housing 11 also includes an external cover 30 to which top wall 27 is secured.

Walls 27 and 29 each include a planar interior diffusing surface 31. These surfaces are oriented within hooded member 25 in preestablished, interdependent patterns in accordance with their respective diffusing capabilities. Accordingly, region 15 is defined by a plurality of interior surfaces which possess different diffusion properties and are oriented therein to assure maximum light output through open end 16 while still maintaining the desired levels of uniformity.

Figure 3:
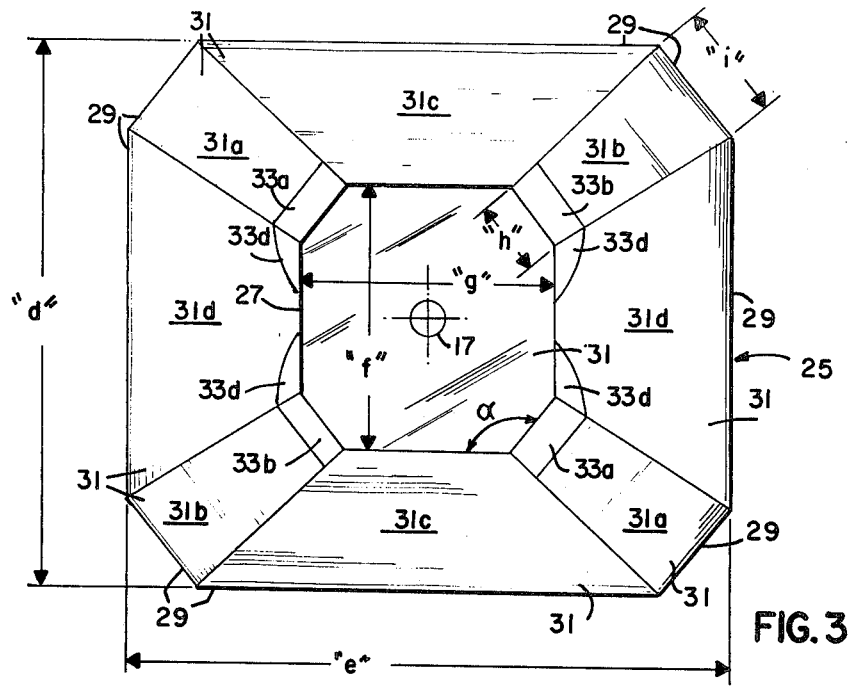
FIG. 3 is a plan view as taken along the line 3—3 in FIG. 1.

FIG. 3, taken along the line 3—3 in FIG. 1, illustrates the positioning relationship of the reflecting diffuse surfaces 31 according to a preferred embodiment of the invention. As shown, the surfaces 31 of side walls 29 are arranged in four opposing pairs 31a, 31b, 31c and 31d. Hooded member 25 is substantially rectangular and has a length (dimension "d") of about 6.25 inches and a width (dimension "e") of about 7.125 inches. All of the side wall surfaces are interconnecting and converge on the interior diffusing surface 31 of end wall 27. End wall 27's surface 31 is preferably substantially square having a length (dimension "f") and width (dimension "g") of 3.0 inches. Light source 17 is centrally located with regard to end wall 27. As shown in FIG. 3, pairs 31a and 31b form diagonals within the rectangular configuration of member 24, while pairs 31c and 31d form the respective opposing sides or ends. Each diagonal surface 31a and 31b is positioned at an angle ($\alpha$) of about 128° with regard to a respective side surface 31c or 31d. Furthermore, each has an interior width (dimension "h") of about 0.875 of an inch and an exterior width (dimension "i") of about 1.25 inches.

According to a preferred embodiment of the invention, at least two opposing pairs of diffusing surfaces 31 possess similar diffusing properties while the remaining pairs are more diffuse. In the embodiment of FIG. 3, pairs 31a, 31b and 31d are similarly diffusing, pair 31c is more diffusing, and the interior surface 31 of end wall 27 possesses still greater diffusion characteristics.

It is preferred in the embodiment of FIG. 3 that pairs 31a, 31b, and 31d each include a portion thereof (33a, 33b, and 33d, respectively) which are similarly diffusing and diffuse light from source 17 greater than any of the aforementioned surfaces. Each of these portions is located on the respective surface nearer light source 17 than the remainder of the surface with the exception of portions 33d. It can be further seen that each surface of pair 31d contains two portions 33d with each portion substantially opposite its counterpart on the opposing side. Each of the portions 33a, 33b, and 33d is positioned at the same angle as that of its respective side (angle $\theta$ in FIG. 1).

Figure 4:
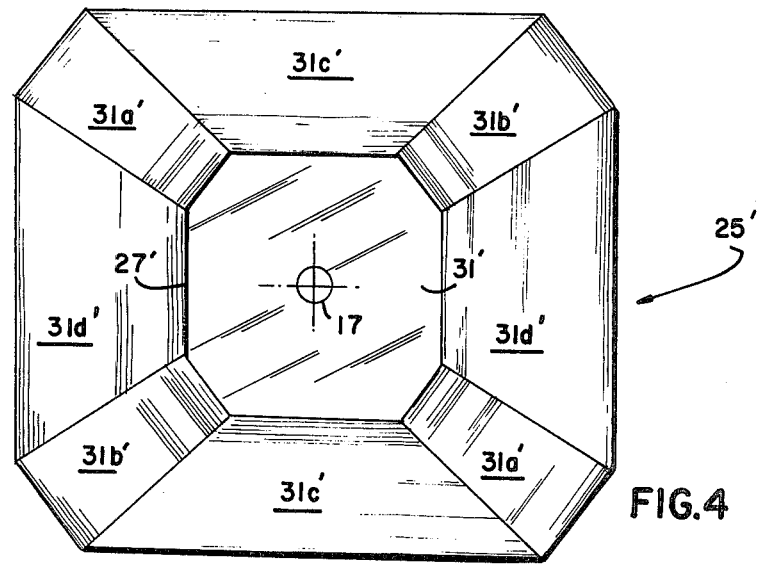
FIG. 4 is a plan view of a light-diffusing region in accordance with an alternate embodiment of the invention.

In FIG. 4 is shown a hooded member 25' in accordance with an alternate embodiment of the invention. Member 25' is substantially similar in size and configuration to member 25 in FIG. 3 and includes four opposing pairs of interior diffusing surfaces 31a', 31b', 31c' and 31d'. Pairs 31a' and 31b' form the diagonals while pairs 31c' and 31d' form the corresponding sides or ends of the substantially rectangular shaped member. All surfaces converge on the interior surface 31' of end wall 27'. It is preferred in the embodiment of FIG. 4 that diagonals 31a' and 31b' possess identical diffusing properties and be the least diffusing of all interior surfaces. Accordingly, surfaces 31c' and 31d' are also similar and represent the most diffusing components in the system while interior surface 31' of end wall 27' has diffusing abilities somewhat between those of the diagonals and the ends. In both the embodiments of FIGS. 3 and 4, the walls 29 which include diffusing pairs 31c and 31c' form an angle θ with wall 27 of about 146°. Walls 29 which include pairs 31d and 31d' form an angle of about 152° while walls 29 which include the diagonals 31a, 31b and 31a', 31b' form an angle of about 156°.

Figure 5:
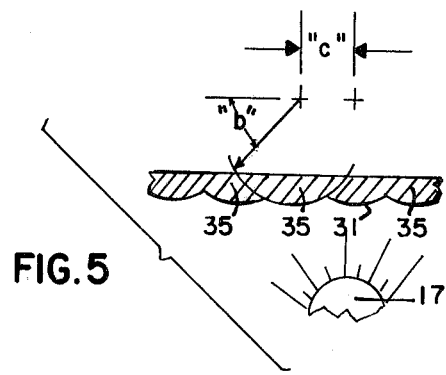
FIG. 5 represents a side elevational view, in section, of the preferred diffusing surfaces of the invention.

Due to the finite number of images which varies with spatial position on the target field (platen 19), there are locations where an image appears or disappears with a small displacement of position. To overcome such variations, it is necessary for the light from each elemental area of diffusing region 15 to be diffused over a limited solid angle while keeping its average distribution such that the gross (or large scale) uniformity is not affected. This is accomplished by introducing local optical power into the interior surfaces of region 15. Accordingly, in FIG. 5 there is shown a sectional view of an interior diffusing surface 31 in accordance with a preferred embodiment of the invention. Surface 31 comprises an array of specular spherical elements 35 which cause the light from source 17 to diverge over said established angle. Elements 35 may be either of concave or convex configuration. The amount of spread or diffusion depends on the ratio of the spherical radius (dimension "b") of each element to the respective diameter of that element. For example, in the embodiment of FIG. 3, surfaces 31a, 31b, and 31d each include an array of spherical elements having a radius of 0.250 inch and a corresponding spherical diameter (dimension "c") in FIG. 5) of 0.062 inch. Additionally, the spherical elements within pair 31c have a radius of 0.125 inch and a corresponding diameter of 0.062 inch. The spherical elements of end wall surface 31 have a radius of 0.062 inch and a corresponding diameter of 0.062 inch. In the invention, it is preferred that walls 27 and 29 are metallic (e.g. aluminum) and that the respective spherical elements are provided therein utilizing a peening operation. It is also possible to use a molded plastic material having a thin layer of aluminum thereon.

With regard to FIG. 4, surfaces 31a' and 31b' each include an array of spherical elements having a radius of 0.50 inch and a corresponding diameter of 0.062 inch. Surface 31' of end wall 27' contains spherical elements each having a radius of 0.35 inch and a diameter of 0.062. Pairs 31c' and 31d' are preferably flat and are painted white having a controlled specular (gloss) component.

The reflective diffusing member 25 of FIG. 3 is best utilized when combined with a partially reflecting, partially diffusing member 41 (FIG. 1) located within housing 11 between regions 13 and 15. Member 41 reflects a portion (e.g. from about 10 to 40 percent) of the light from source 17 back toward surfaces 31 where it is re-diffused toward member 41 at a smaller angle of incidence. It is preferred in the present invention to not utilize member 41 in combination with the hooded member 25' shown in FIG. 4. To explain the operation of member 41, consider viewing diffusing region 15 from the target field (platen 19). The number of light source images observable from any position in the field ranges from one to three. Each is of substantially equal luminance since they are the result of direct reflecting from the source. With member 41 in place, an additional set of fainter light source images will be seen. This set of images is displaced toward the outer portion of region 15, that is, each is caused by a virtual image of the source below the system's masking member (to be described) symmetrical with member 41.

When using the hooded member 25 of FIG. 3, a diffusing element 43 is employed between regions 13 and 15 to diffuse the light from source 17 that would otherwise enter open end 16 and directly strike platen 19. Element 43 is located immediately below light source 17 to provide this effect. Also, it is preferred to utilize an opaque masking member 45 adjacent element 43 and in engagement therewith to prevent any variable light from the lamp (such as may be emitted from an end portion) from affecting the system's uniformity. Element 43 is rectangular and member 45 is circular. In one embodiment, element 43 is square with sides each 2.0 inches long while mask 45 has a diameter of 0.75 inch. Mask 45 is centrally oriented with respect to element 13 and both components are centrally positioned on axis "y-y" of housing 11. In the embodiment of FIG. 4, element 43 is opaque and is employed between regions 13 and 15 to only diffuse light back toward region 15.

Platen 19 is preferably from about 0.125 to about 0.250 inches thick. Member 41 may comprise a thin membrane or an element having a thickness approaching 1.5 inches. It is understood that as member 41 is increased in thickness, the gain of the invention may also be increased. This occurs because more of the light from source 17 will be reflected back toward surfaces 31 to thus increase the chances of said light passing out open end 16 (or striking platen 19 if this component is utilized).

Figure 6:
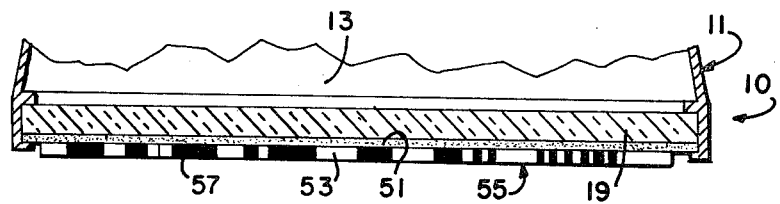
FIG. 6 is a partial side elevational view of a reflex copier which includes a light exposure device and a suitable layer of photosensitive material.

In FIG. 6 there is shown a portion of housing 11 which includes the planar light-transmitting platen 19 located adjacent the housing's light-absorbing region 13. As earlier stated, a desired use for the previously defined light exposure device is as part of a portable reflex copier. Accordingly, device 10 is provided with a layer of suitable photosensitive material 51 which is positioned adjacent platen 19 and is adapted for receiving light passing through the platen and reflecting off selected reflective areas 53 within an original 55 back toward the platen. Original 55, which may consist of an ordinary document, sheet of typewritten paper, etc., typically contains the aforementioned reflective areas 53 in addition to darkened, absorptive areas 57. Understandably, the absorptive areas will tend to absorb rather than reflect the light from platen 19 striking original 55.

In operation, device 10 is located above original 55 such that photosensitive material 51 is positioned on and in immediate contact with the original. In comparing FIGS. 1 and 6, it can thus be seen that absorbing region 13 is located between the light source 17 (within light-diffusing region 15) and the respective original 55 which is exposed during said operation. Original 55 is shown in FIG. 6 as being located at the device's open end. The device's light source is triggered and an exposure is completed to provide a reflex copy of material 51. Device 10 thus readily serves as a portable, compact reflex copier when utilized in the above combination. Examples of suitable photosensitive materials 51 for use within the invention are described in U.S. Pat. Nos. 3,121,162 (Roman et al), 3,515,552 (Smith), 3,740,220 (De Haes et al), and 3,811,773 (Urancken), said disclosures incorporated herein by reference.

The invention as defined is particularly suited for copying 8½ × 11 inch documents. Additionally, device 10 has a total volume of less than 0.5 ft.³ to assure its acceptability in the portable copying field.

Thus there has been shown and described a light exposure device which is compact, easy to operate, relatively inexpensive to produce, and assures uniform exposure of a respective original. The device may be used for several purposes, including exposure of contact prints, etc. or it may constitute part of a reflex system which further includes a suitable photosensitive paper or material for obtaining the desired copies. As stated, the interior surfaces of the device's sloping side walls have been blackened to absorb the light emitted from the device's light source that would otherwise strike the platen at angles exceeding the required incident range. This absorption thus meets the previously stated objectives of providing constant exposure and resulting high resolution. If the interior darkened surfaces of sloping walls 21 were made reflective as in devices presently known, the resulting efficiency would increase into the 40 to 50 percent range. This would indicate that a appreciable fraction of the light reaching the platen would strike this member at angles far from the desired range. The corresponding result would be a tenfold increase in the change in average exposure for the extreme range of document reflectance (the present system has a typical change of about ±2 percent). Excessive variations of the above magnitude are considered highly adverse since they not only alter the average exposure, but if the document changes reflectance as a result of localized dark areas (e.g. illustrations), the spatial uniformity of irradiance is greatly affected. The present invention substantially eliminates this possiblity.

As a further modification to the present invention, an automatic exposure density control could be added. This would be particularly desired should an incandescent lamp (e.g. tungsten-halogen) be used. A photodetector, properly located within housing 11, would view the light reflected from the document. By techniques well know in the art, the photodetector would control switching of the lamp in accord with the exposure energy delivered.

While there have been shown and described what are at present considered the preferred embodiments of the invention, it will be obvious to those skilled in the art that various changes and modifications may be made therein without departing from the scope of the invention as defined by the appended claims.

What is claimed is:

1. A light exposure device for exposing an original, said device comprising:
   a housing including an open end adapted for having said original located thereat, said housing defining therein a light-absorbing region located adjacent said open end of said housing and a light-diffusing region located immediately adjacent said light-absorbing region; and
   a light source positioned within said light-diffusing region of said housing, said light-diffusing region of said housing directing the light from said light source toward said light-absorbing region and said open end of said housing whereby a portion of said light from said light source will pass through said open end in a substantially uniform manner and strike said original, said light-absorbing region located between said light source and said original.

2. The light exposure device according to claim 1 further including a light-transmitting platen positioned within said open end of said housing for receiving said portion of light from said light source.

3. The light exposure device according to claim 2 wherein said housing includes a plurality of sloping walls each having a substantially planar, darkened interior surface and positioned at a predetermined angle with said platen, said sloping walls defining said light-absorbing region.

4. The light 5 device according to claim 3 wherein said predetermined angle is within the range of about 5 to about 30 degrees.

5. The light exposure device according to claim 3 wherein said sloping walls are positioned in a telescoping arrangement to permit compressing of said housing.

6. The light exposure device according to claim 3 wherein said housing further includes a hooded member having an end wall and a plurality of side walls, said end wall and said side walls defining said light-diffusing region and each including a substantially planar, interior diffusing surface, said diffusing surfaces of said side walls positioned at an established angle with the diffusing surface of said end wall.

7. The light exposure device according to claim 6 wherein said established angle is within the range of about 146 to about 156 degrees.

8. The light exposure device according to claim 6 wherein said interior diffusing surfaces of said side walls are 146 within said 156 member in four opposing pairs.

9. The light exposure device according to claim 8 wherein the interior diffusing surfaces of at least two of said opposing pairs of side walls have similar diffusing characteristics, the diffusing surfaces of the remaining opposing pairs of side walls being more diffusing than said similarly diffusing opposing pairs.

10. The light exposure device according to claim 9 wherein the number of opposing pairs of side walls having interior diffusing surfaces with similar diffusing characteristics is three.

11. The light exposure device according to claim 9 wherein the interior diffusing surface of said end wall is more diffusing than the diffusing surfaces of said similarly diffusing opposing pairs of side walls and less diffusing than the diffusing surfaces of said remaining pairs of side walls.

12. The light exposure device according to claim 10 wherein the interior diffusing surface of said end wall is more diffusing than the interior diffusing surfaces of said opposing pairs of side walls.

13. The light exposure device according to claim 12 wherein a portion of each of the interior diffusing surfaces of said three similarly diffusing pairs of side walls is more diffusing than the remainder of said surface.

14. The light exposure device according to claim 1 further including a partial light-transmitting member positioned within said housing between said light-diffusing region and said light-absorbing region, said partial light-transmitting member reflecting part of the light from said light source back toward said light-diffusing region.

15. The light exposure device according to claim 1 further including a diffusing element positioned within said housing between said light source and said open end of said housing, said element diffusing the light passing directly from said light source to said open end.

16. The light exposure device according to claim 15 further including an opaque masking member located adjacent said diffusing element and between said light source and said open end, said masking member preventing a predetermined portion of the light from said light source from passing through said open end.

17. The light exposure device according to claim 2 further including a layer of photosensitive material located immediately adjacent said light-transmitting platen for receiving the light from said platen and adapted for being positioned against said original, said photosensitive material absorbing at least a portion of the light which passes through said photosensitive material and is reflected from selected areas within said original back toward said platen, said light exposure device comprising a portable reflex copier.

* * * * *

UNITED STATES PATENT AND TRADEMARK OFFICE
CERTIFICATE OF CORRECTION

PATENT NO. : 4,128,333
DATED : December 5, 1978
INVENTOR(S) : ROBERT E. LEVIN; GEORGE J. ENGLISH It is certified that error appears in the above-identified patent and that said Letters Patent are hereby corrected as shown below:

In the Claims:

Claim 4, line 1 - after "light", please delete "5" and add -- exposure --.

Claim 8, line 3 - after "are", please delete the number "146 and insert -- arranged --.

Claim 8, line 3 - after "said", please delete the number "156" and insert -- hooded --.

Signed and Sealed this

Thirteenth Day of March 1979

[SEAL]

Attest:

RUTH C. MASON
Attesting Officer

DONALD W. BANNER
Commissioner of Patents and Trademarks